UNITED STATES PATENT OFFICE.

ERNEST AUGUSTE GEORGE STREET, OF PARIS, FRANCE.

PROCESS OF MAKING EXPLOSIVES.

SPECIFICATION forming part of Letters Patent No. 625,365, dated May 23, 1899.

Application filed December 21, 1898. Serial No. 699,943. (No specimens.)

*To all whom it may concern:*

Be it known that I, ERNEST AUGUSTE GEORGE STREET, a citizen of the Republic of France, and a resident of Paris, France, have invented a new and useful Improvement in or Relating to Explosives, which is fully set forth in the following specification.

In my United States Patent No. 598,618, granted February 8, 1898, I have described the manufacture of chlorate powders by means of solutions of nitro or azo derivatives in animal or vegetable oil mixed with chlorate of potash at a temperature at which these solutions are liquid.

This invention has for its object to guarantee to me the exclusive right to apply the same process to other chlorate powders by substituting pitch or solid or pasty tars for the whole or part of the nitro or azo derivatives.

When by substituting tars for nitro derivatives too soft a product is obtained, a little pulverized charcoal, cellulose powder, or starch may be added. Thus a very good quality of powder is obtained at a very small cost.

Nitro or azo derivatives, alone or mixed together, dissolve in the mixture of oil and tar as well as in oil alone. However, in the great variety and number of these products I have found, for a small number of samples, that picric acid formed, with certain parts of tar, compounds insoluble in the mixture of oil and tar and fusible with difficulty. Certain of these samples came from coal. When picric acid is to enter into the composition, it will be therefore preferable to take dry pitch (brai) or wood-tars. All the tars may, on the contrary, be used in other cases. In these conditions—that is to say, mixed with oil—the tars enable powders to be obtained which do not dry up, which drying takes place very quickly when tar alone is used.

The following are some examples of these explosives produced according to this invention:

No. 1: Chlorate of potash, eighty; dry pitch, ten; vegetable oil, ten.

No. 2: Chlorate of potash, eighty; tar or dry pitch, ten; vegetable oil, six; charcoal, four.

No. 3: Chlorate of potash, eighty; tar or dry pitch, ten; vegetable oil, six; charcoal, two; picric acid, two.

No. 4: Chlorate of potash, eighty; tar, ten; vegetable oil, six; picric acid, four.

In the examples Nos. 3 and 4 another nitro or azo derivative may be substituted for the picric acid.

The method of manufacture of these explosives is the same as that described in my patent referred to above. The pitch or tar is dissolved in oil heated in a water-bath, the nitro or azo derivative is incorporated with the liquid mixture, and then the charcoal, (if used.) When the mixture of these substances is thoroughly homogeneous, alkaline chlorate or perchlorate is introduced in small quantities and the whole mass is stirred and may be finally placed in cartridges.

What I claim is—

1. The process of manufacturing explosives by dissolving pitch or tar in oil while heating the latter and adding chlorate powder while maintaining the solution fluid by heat.

2. The process of manufacturing explosives consisting in dissolving pitch or tar and an azo or nitro derivative in oil while the latter is heated, and adding a chlorate.

In testimony whereof I have signed this specification in the presence of two subscribing witnesses.

ERNEST AUGUSTE GEORGE STREET.

Witnesses:
EDWARD P. MACLEAN,
EMIL SCOBRET.